United States Patent [19]
Köster et al.

[11] Patent Number: 5,869,742
[45] Date of Patent: Feb. 9, 1999

[54] PROCESS TO DETERMINE THE UTILIZED FRICTIONAL VALUE BETWEEN WHEEL AND ROADWAY

[75] Inventors: Harald Köster, Hanover; Konrad Rode, Seelze; Hartmut Rosendahl, Hanover; Frank Zielke, Barsinghausen, all of Germany

[73] Assignee: WABCO GmbH, Hanover, Germany

[21] Appl. No.: 699,646

[22] Filed: Aug. 19, 1996

[30] Foreign Application Priority Data

Aug. 21, 1995 [DE] Germany .......................... 195 30 632.5

[51] Int. Cl.$^6$ ............................. G01N 19/02; G01L 5/28; G01M 17/06
[52] U.S. Cl. ........................... 73/9; 73/129; 701/70; 701/71
[58] Field of Search ................... 73/9, 121, 129; 364/426.01, 426.015, 426.017, 426.018, 426.019, 426.023, 426.024, 426.025, 426.026; 701/70, 71, 73, 74, 75, 80

[56] References Cited

U.S. PATENT DOCUMENTS

| | | | |
|---|---|---|---|
| 4,520,444 | 5/1985 | Koos ..................................... | 73/126 X |
| 4,794,538 | 12/1988 | Cao et al. ......................... | 364/426.018 |
| 4,893,242 | 1/1990 | Rogers et al. ......................... | 73/126 X |
| 4,984,165 | 1/1991 | Müller et al. .................... | 364/426.019 |
| 4,999,778 | 3/1991 | Ruhl et al. ....................... | 364/426.018 |
| 5,299,452 | 4/1994 | Caron et al. .............................. | 73/129 |
| 5,375,452 | 12/1994 | Helldörfer et al. ........................... | 73/9 |
| 5,455,770 | 10/1995 | Hadeler et al. ........................... | 701/70 |
| 5,513,907 | 5/1996 | Kiencke et al. .................. | 364/426.028 |
| 5,557,523 | 9/1996 | Yeh et al. ......................... | 73/121 X |
| 5,735,579 | 4/1998 | Wood et al. ............................. | 701/70 X |
| 5,752,212 | 5/1998 | Wood et al. ............................... | 701/71 |

FOREIGN PATENT DOCUMENTS

| | | |
|---|---|---|
| 0 412 791 A2 | 2/1991 | European Pat. Off. . |
| 0 453 811 A2 | 10/1991 | European Pat. Off. . |
| 0 630 786 A1 | 12/1994 | European Pat. Off. . |
| 35 35 843 A1 | 4/1987 | Germany . |
| 3705983 | 9/1987 | Germany . |
| 38 33 211 A1 | 4/1990 | Germany . |
| 39 22 528 C1 | 7/1990 | Germany . |
| 4300048 | 10/1994 | Germany . |
| 43 17 050 A1 | 11/1994 | Germany . |
| 44 35 448 A1 | 4/1995 | Germany . |
| 41 34 831 C2 | 5/1995 | Germany . |

OTHER PUBLICATIONS

*Patent Abstracts of Europe* DE 03833211A1 Apr. 5, 1990 "Method for the continuous determination of the static coefficient of friction mu".

*Patent Abstracts of Europe* DE 0392528C1 Jul. 19, 1990 "Detecting limit of ground adhesion of vehicle tires—measuring steering arm torque comparin, measured val(u)e with reference & comparing difference to . . . ".

*Patent Abstracts of Europe* DE 04317050A1 Nov. 24, 1994 "System for Determining the adhesion coefficient in vehicles".

Patent Abstracts of Europe DE 04435448A1 Apr. 20, 1995 Method for Permanently determining the coefficient of adhesion of a carriage way.

*Primary Examiner*—Thomas P. Noland
*Attorney, Agent, or Firm*—Proskauer Rose LLP

[57] ABSTRACT

A method is provided for at least approximately determining the frictional value utilized between a wheel and the roadway. The method uses a vehicle weight that is determined, at least approximately, and a momentary actuating energy of a brake that is determined during a braking action. The method calculates the frictional value from the momentary actuating energy, the vehicle weight, and the wheel braking factor. In another embodiment, the method determines, at least approximately, the momentary vehicle deceleration. The frictional value is calculated from the momentary vehicle deceleration during braking and the Earth's gravitational acceleration.

6 Claims, 1 Drawing Sheet

PROCESS TO DETERMINE THE UTILIZED FRICTIONAL VALUE BETWEEN WHEEL AND ROADWAY

FIELD OF THE INVENTION

The present invention relates to a process for determining the frictional value experienced during brake application between a wheel of a vehicle and the roadway. A particular field of use is anti-lock brake systems (ABS) for vehicles.

BACKGROUND OF THE INVENTION

In the automotive art, the term "actuating energy" is not to be understood in a strictly physical sense. Instead, actuating energy is a collective term for all media which, when supplied to a wheel brake, produce a braking force. The "wheel braking factor" is a value which is practically constant for each assembly consisting of the wheel, the wheel brake, the brake actuator and, possibly, existing transmission devices. The wheel braking factor includes all of the characteristics of the brake actuator (e.g., brake cylinder), ratios of the transmission devices, the characteristics of the wheel brake (e.g., internal ratios, internal frictional value), and the efficiencies of these devices, as well as the wheel size itself. The wheel braking factor denotes the relationship between an actuating energy supplied to a wheel brake and the resulting braking force between the appertaining wheel and the roadway. This braking force acts tangentially in the contact surface of the wheel. If the wheel braking factor is designated "A," the momentary actuating energy "E," and the resulting braking force "B," the following formula generally applies:

$$B = A \cdot E \tag{I}$$

Generally, the "actuating energy" is to be understood as being the "effective actuating energy" which remains after deduction of the response energy. The response energy is based on response resistances which are to be attributed to friction and resetting forces in the braking components.

A "reference velocity" is produced in the ABS control system in vehicles equipped with an anti-lock brake system, as is customary. The reference velocity is based on one or several wheel velocities at the beginning of a braking action and on the true course or on a predicted course of the wheel speed(s) during braking. The reference velocity represents a substitute value for the vehicle speed based upon which the ABS control system evaluates the locking tendency of the braked vehicle wheel or wheels, and controls the course of ABS regulation.

In vehicles with several braked axles or axle groups, the actuating energy distribution among the wheel brakes of the axles or axle groups must be stability-optimizing. The term "axle groups" means several axles which are located so close together or are so coordinated with each other that they act as one axle. For example, a double axle aggregate with a distance between axles of up to 1.6 m constitutes an axle group if the axles are statically and dynamically balanced among each other with respect to load distribution and utilization of frictional value between wheels and roadway.

"Stability-optimizing actuating energy distribution" means that the braking system brings about such a distribution of the actuating energy among the wheel brakes that in braking actions which are not ABS-regulated, the same frictional value utilization takes place between all wheels and the roadway. The consequence of such an actuating energy distribution is an optimal vehicle deceleration with good directional stability. The braking system can bring about such an actuating energy distribution completely or nearly completely. Conventional braking system are usually provided with a load-dependent braking force regulator for the purpose of generating this type of actuating energy distribution. In the art, this type of system is designated by the abbreviation "ALB," while the braking systems with electrical control, hereinafter called "EBS," achieve this distribution normally through the suitable design of an EBS control device. Further details in this matter and indications for obtaining such an actuating energy distribution in vehicles with EBS are found, for example, in EP 0 548 488 A1 and in U.S. Pat. No. 5,338,106 which are both based on the same German parent application.

A process is known from EP 0 453 811 A2, specifically from the bottom of page 5 to the top of page 6 of that patent document. The process described therein determines the available and therewith the utilized frictional value between a wheel and the roadway in an ABS-regulated braking action as the wheel starts to roll back up, i.e., from the wheel acceleration once a minimum wheel velocity has been reached. The "available frictional value" refers to the highest frictional value that the roadway can offer which value varies with the road surface conditions, e.g., an asphalt roadway will offer an available frictional value of up to $\mu=0.9$ when dry and perhaps $\mu=0.1$ when icy. This means that on a dry road, a brake force of 90% of the wheel load can be transferred between wheel (tire) and roadway, while on an icy road, only a brake force of 10% of the wheel load can be transferred. The "utilized frictional value" is the fraction of the available frictional value actually utilized during a braking action. In braking actions on a dry road surface, except when wheel lock occurs, the utilized frictional value is rarely equal to the available frictional value.

SUMMARY OF THE INVENTION

It is the object of the present invention to provide a method for at least approximately determining the frictional value between the wheels and the roadway not only in a braking action that is ABS-regulated.

In one embodiment, the frictional value between a vehicle wheel and the roadway which is utilized during a braking action is calculated by determining the vehicle weight, at least approximately, braking the vehicle, detecting a momentary actuating energy, e.g., momentary actuating pressure, during the braking, and calculating the frictional value from the momentary actuating energy, the vehicle weight, and the wheel brake factor.

In another embodiment, the frictional value is calculated by braking the vehicle, determining the vehicle's momentary deceleration during the braking action, and calculating the frictional value from the momentary vehicle deceleration and the Earth's gravitational acceleration.

The invention can be used in any vehicle having at least one braked wheel. Depending on the embodiment of the invention which is selected, the vehicle may need to be equipped with one or several actuating energy sensors (depending on the number of wheel brakes). Additionally, the vehicle may also need to be equipped with a deceleration sensor for determining vehicle deceleration, a load sensor for measuring the vehicle weight and an evaluation circuit which processes their signals if such a circuit is not already present. If a deceleration sensor or load sensor is unavailable, the vehicle weight can be determined by means outside of the vehicle, e.g., by means of a scale.

Vehicles equipped with EBS are easily adapted to the invention because an EBS already includes an electrical control device which can be configured into the required evaluation circuit at little cost. Often, the EBS also comprises one or several actuating energy sensors and/or one or several load sensors, and in that case the cost for applying the invention is further reduced. Vehicles equipped with ABS are also easily adapted to the present invention because the angle-of-turn signals of the appertaining wheel sensors or evolution with time off the reference velocity produced in the ABS control device can be used to calculate, either precisely or approximately, the momentary vehicle deceleration so that, depending on the embodiment of the invention that is selected, a deceleration sensor is unnecessary. In vehicles which are equipped with an EBS including actuating energy sensor(s), as well as with an ABS, the present invention can be applied practically without any additional expense. This is because in such case, the above-mentioned calculation of the momentary vehicle deceleration, as well as the precise or approximate calculation of the vehicle weight, is possible thanks to this equipment.

In vehicles equipped with an ABS, the present invention makes it possible, in the course of an ABS-regulated braking action, to determine at least approximately the frictional value available between the wheels and the roadway. This is because during such a braking action, the utilized frictional value is equal to the available one. Furthermore, the present invention makes it possible to make use of the frictional value obtained in an ABS-regulated braking action even during the respective braking action and/or during one or several subsequent ABS-regulated braking action(s) for the optimization of the ABS-regulation, e.g., at the start of such subsequent action.

The invention can be implemented with any type of actuating energy, e.g., with electrical energy or with pressure. If pressure is used, the energy carriers are usually liquid or gaseous pressure media, e.g., compressed air. If pressure is used as the actuating energy and the momentary supplied pressure or the momentary effective pressure is designated by "p," the above-indicated general relationship (I) becomes:

$$B = A \cdot p \tag{II}$$

whereby that which has been said earlier regarding the actuating energy or the effective actuating energy applies to the momentary pressure or the momentary effective pressure.

Additional advantages of the invention are disclosed in the following explanation with reference to an embodiment shown in the drawings.

DETAILED DESCRIPTION OF THE INVENTION

Figure 1:
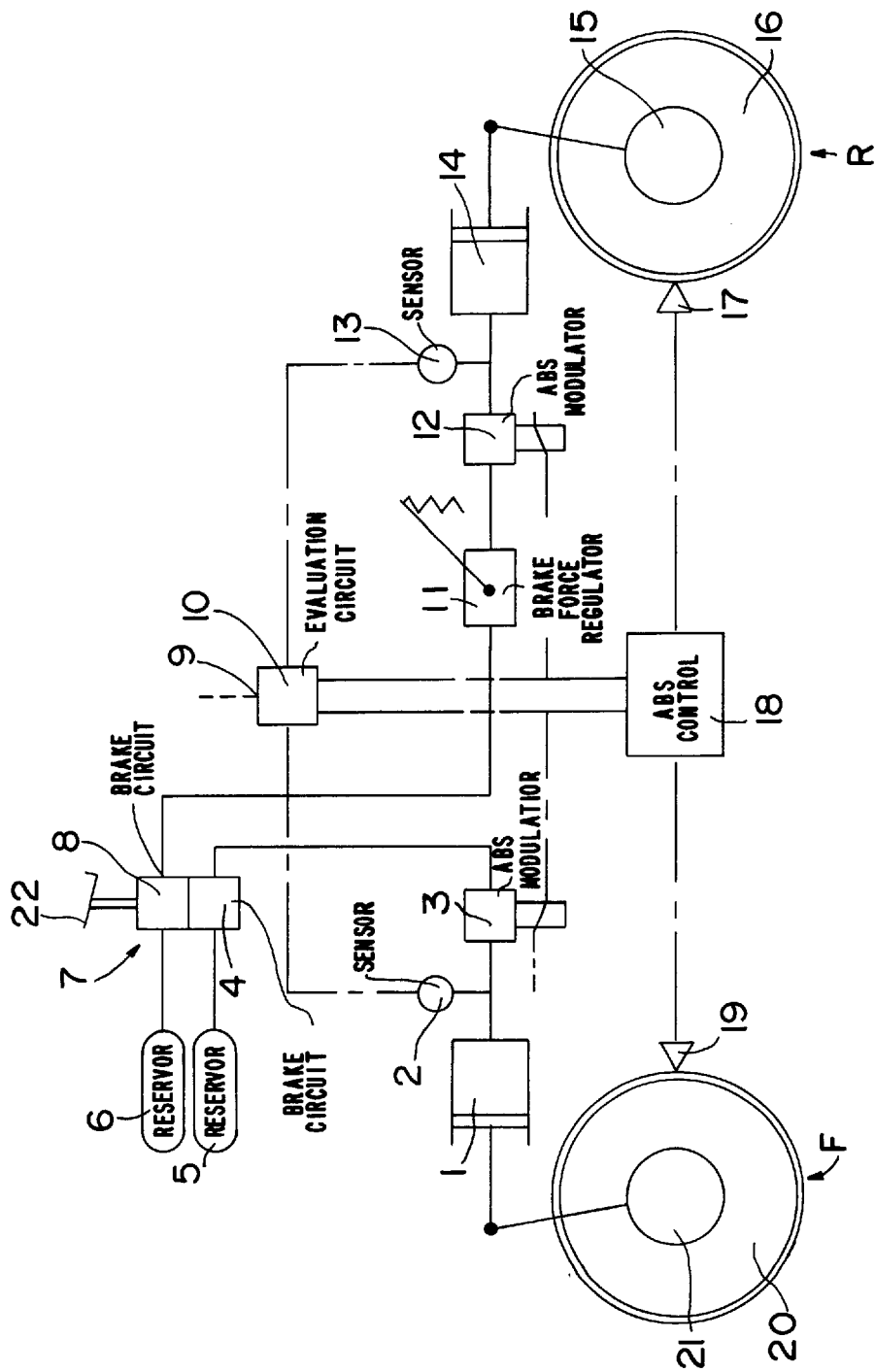
FIG. 1 shows a schematic diagram of a braking system which implements the process of the present invention.

FIG. 1 schematically shows two wheels (16, 20) and the braking system of a vehicle, with full connecting lines representing the actuating energy lines and broken connecting lines representing signal lines.

The wheels (16, 20) are located on different axles or axle groups (R, F) which shall be designated hereinafter as "rear axle (R)" and "front axle (F)." Further below, the letters "R" and "F" are also used as indicators to characterize the attribution of certain quantities to the rear axle (R) or to the front axle (F).

The braking system shown in FIG. 1 contains a basic design and a further development of same. The braking system uses pressure as the actuating energy. Compressed air or a liquid pressure medium is used as the energy carrier so that pressure media lines are the actuating energy lines.

The basic equipment of the braking system consists of a pressure supply system (5, 6), a wheel brake (15, 21) for each wheel (16, 20), and the appertaining brake cylinders (14, 1). In addition, a control system (7, 11) and a frictional value determining device (2, 10, 13) are also part of the braking system.

Of the pressure supply system, only the reservoirs (6, 5) assigned to the wheel brakes (15, 21) are shown. One or several pressure generators, and pressure medium preparation and protective installations (not shown), all of known design, are also part of the pressure supply system. One reservoir (6, 5) can be connected via a pressure medium line to one assigned brake cylinder (14, 1). Between each wheel brake (15, 21) and its appertaining brake cylinder (14, 1), transmission devices (not designated) are provided.

The basic control system consists of a brake valve (7) which can be actuated by the vehicle driver and an ALB (11). The brake valve (7) has two circuits (8, 4) and is installed with each circuit (8, 4) in the pressure line between a reservoir (6, 5) and its appertaining brake cylinder (14, 1). The brake valve (7) has an operating element (22) which is indicated in FIG. 1 in the form of a pedal. The ALB (11) is installed in the pressure medium line between the output of one circuit (8) of the brake valve (7) and the brake cylinder (14) of the rear axle (R). When the driver exerts a force on the operating element (22), each circuit (8, 4) of the brake valve (7) establishes a connection between its output and the appertaining reservoir (6, 5) until a certain output pressure, which is determined by the above-mentioned force, appears at the output. If the driver then maintains the above-mentioned force, each circuit (8, 4) of the brake valve (7) maintains the above-mentioned output pressure. If the driver decreases the force exerted upon the operating element (22), each circuit (8, 4) also decreases the output pressure accordingly.

The output pressure of the circuit (4) of the brake valve (7) assigned to the brake cylinder (1) of the front axle (F) also builds up in this brake cylinder (1). The output pressure of the circuit (8) of the brake valve (7) assigned to the rear axle (R) is decreased by the ALB (11) as a function of the load of the rear axle (R), i.e., the rear axle load, so that the pressure building up in the brake cylinder (14) is regulated as a function of the rear axle load. The ALB (11) thereby ensures a precise, stability-optimizing or near stability-optimizing pressure distribution among the brake cylinders (14) and (1) and the appertaining wheel brakes (15) and (21). This means, in other words, that when the frictional value between a wheel and the roadway is designated in the usual manner by "$\mu$" the ALB (11) ensures, at least approximately, an equal frictional value utilization between the wheel (20) of the front axle (F) and the roadway and the wheel (16) of the rear axle (R) and the roadway, so that it is possible to say:

$$\mu R = \mu F \tag{III}$$

The construction and action of all components of the braking system mentioned so far are known and can be carried out by devices on the market.

The device for the determination of frictional value (2, 10, 13) consists of, in a first embodiment, pressure sensors (13, 2) each of which detects the pressure in one brake cylinder (14, 1), and evaluation circuit (10).

The evaluation circuit (10) has inputs, which are not further designated, as well as at least one output (9). The evaluation circuit (10) is equipped electrically in the usual manner, e.g., with microprocessors, and is programmed so that it is able to carry out the operations described below.

In the evaluation circuit (10) the response pressures of the wheel brakes (15, 21), as well as the wheel braking factors (AR) of the rear axle (R) and (AF) of the front axle (F), are stored in the form of fixed values for the vehicle or vehicle type in question.

The pressure sensors (13, 2) are connected electrically to the inputs of the evaluation circuit (10). The pressure sensors (13, 2) convert the pressures they measure into electrical pressure signals and transmit these signals in the form of variable values to the evaluation circuit (10). The vehicle weight (W) is supplied to the evaluation circuit (10) as an additional variable value. The variable value (W) of the vehicle weight does not change as a rule during a trip. For this reason, and in the simplest case, the vehicle weight (W) can be determined by weighing the vehicle and by entering it manually in the evaluation circuit (10). However, the vehicle weight (W) can also be obtained in a known manner by means of one or several load sensors (not shown) which transmit the weight (W) to the evaluation circuit (10).

The frictional value utilized between a wheel and the roadway during braking is the ratio between the braking force acting between the wheel and the roadway and the force perpendicular to the roadway taking effect between wheel and roadway. Under the present assumption of a two-wheel vehicle, this wheel load is also the corresponding axle load, i.e., the front axle load (FL) or the rear axle load (RL), so that:

$$\mu F = \frac{BF}{WF} \text{ and} \tag{IV}$$

$$\mu R = \frac{BR}{WR}. \tag{V}$$

On the other hand, an average frictional value ($\mu$W) utilized on the vehicle can be defined as the ratio between the total braking force Btot=BF+BR=AF·pF+AR·pR acting upon the vehicle and the vehicle weight (W). From equations (III) to (V) it is possible to conclude that the mentioned mean frictional value ($\mu$W) and the frictional values ($\mu$F and $\mu$R) utilized at the wheels (16, 20) must be identical. Knowing the mean frictional value ($\mu$W) utilized on the vehicle makes it possible to know at the same time the frictional values ($\mu$F or $\mu$R) utilized at the wheels (16, 20). For this reason the following formula applies:

$$\mu W = \mu F = \mu R = \mu = \frac{AF * pF + AR * pR}{W}. \tag{VI}$$

The equation (VI) is programmed into the evaluation circuit (10) as a processing algorithm for the above-mentioned fixed and variable values.

During braking, the evaluation circuit (10) at first decreases the pressure signals of the pressure sensors (13 or 2) by values corresponding to the response pressures of the wheel brakes (15 or 21) and then, using the thus acquired effective pressures (pF, pR), determines the frictional value according to equation (VI). For this, frictional value or equivalent frictional values only the symbol "$\mu$" will be used hereinafter.

In equation (VI), and according to the basic laws of Newtonian mechanics, the numerator can be set equal to m·b and the denominator set equal to m·g, where the vehicle mass is given by m, the vehicle deceleration is given by b, and the Earth's gravitational acceleration is given, as is customary, by g, so that the following equation also applies:

$$\mu = b/g \tag{VII}$$

The latter equation is used in another embodiment of the invention for the determination of the frictional value. In this embodiment, the equation (VII) instead of (VI) is programmed into the evaluation circuit (10) as a processing algorithm, and instead of the response pressures (pF, pR) and the wheel brake factors (AF, AR) of the wheel brakes (15, 21), the Earth's gravitational acceleration (g) is stored as a fixed value in the evaluation circuit (10). Instead of the pressure sensors (2, 13), a deceleration sensor (not shown) is required, and its deceleration signals are transmitted to the evaluation circuit (10) in the form of variable values. The input of the vehicle weight (W), as an additional variable value, is not needed in this embodiment.

Equipping the device for the determination of the frictional value with a deceleration sensor and the transmission of its deceleration signals to the evaluation circuit (10), may also be useful in the first-described embodiment of the device for the determination of frictional value using equation (VI) as the processing algorithm. This is because the deceleration signals make it possible to determine the vehicle weight (W) precisely, or approximately, and thus makes a separate detection of same unnecessary. This embodiment is based on the basic law of Newtonian mechanics:

$$m = \frac{W}{g} = \frac{Btot}{b} \tag{VIII}$$

from which it is possible to derive:

$$W = \frac{AF * pF + AR * pR}{b} * g. \tag{IX}$$

In this embodiment, equation (IX) is programmed into the evaluation circuit (10), in addition to equation (IV), as a processing algorithm. In addition, the evaluation circuit (10) is programmed in such a manner in this embodiment that it calculates at first the momentary effective pressure signals (pF, pR) as described above from the pressure signals of the pressure sensors (13 or 2) in one or more braking actions that precede one or more braking actions associated with the determination of the frictional value ($\mu$) according to equation (VI). Further, in this or these preceding braking actions, the evaluation circuit (10) detects the momentary vehicle deceleration (b) associated with the pressure signals from the deceleration signals and calculates the vehicle weight (W) according to equation (IX). The evaluation circuit (10) then carries out the calculation of the frictional value ($\mu$) according to equation (VI) in the next braking actions associated with the determination of the frictional value according to equation (VI).

The last embodiment is especially advantageous when the vehicle deceleration is measured and/or calculated for other purposes within the vehicle or when appropriate measuring devices, e.g., wheel sensors, are present. This is, e.g., the case for vehicles equipped with EBS and/or ABS.

At its output (9), the evaluation circuit (10) emits the frictional value it has calculated. It may be displayed by means of a display device (not shown) or be used in some other practical manner. A display of the frictional value, e.g., would give the driver information and/or a warning on the intensity of his braking.

The above-mentioned further development of the basic equipment of the braking system shall now be considered. This further development consists of an additional control device in the form of an ABS. The ABS consists of an ABS control device (18) as well as wheel sensors (17, 19) and an ABS modulator (12, 3) for each wheel. The ABS modulator (3) for the wheel (20) of the front axle (F) is located in the pressure medium line between the output of the appertaining circuit (4) of the brake valve (7) and the appertaining brake cylinder (1). The ABS modulator (12) for the wheel (16) of the rear axle (R) is located in the pressure medium line between the ALB (11) and the appertaining brake cylinder (14). The wheel sensors (17, 19) are connected electrically to inputs of the ABS control device (18). The electrical control parts of the ABS modulators (12, 3) are connected to outputs of the ABS control device (18). These outputs of the ABS control device (18) are also connected to inputs of the evaluation circuit (10) not mentioned so far.

The evaluation circuit (10) and the ABS control device (18) are represented as independent assemblies, but as a rule they are gathered together, combined and integrated in both structure and function.

The wheel sensors (17, 19) transmit angle-of-turn signals to the ABS control device (18). The latter, using these signals, produces the earlier-mentioned reference speed and uses it, often in combination with other quantities, to check whether one or both wheels (16, 20) is tending to lock. If the ABS control device (18) does not detect any locking tendency, it does not transmit any control signals to the ABS modulators (12, 3). The ABS modulators (12, 3) remain open as a result and allow the pressure determined by the brake valve (7) or by the ALB (11) to build up in the brake cylinders (14) or (1). However, if the ABS control device (18) detects a locking tendency, it transmits control signals to the corresponding ABS modulator or modulators (12, 3), whereupon the latter limit the pressure build-up in the corresponding brake cylinder(s) (14, 1) to such extent, or lower the existing pressure to such extent, that the locking tendency disappears. In this case, the ABS control device (18) determines the magnitude and/or the evolution with time of the control signals transmitted to the ABS modulator (s) (12, 3), in accordance with programmed regulating algorithms, in order to ensure protection against locking with good utilization of the frictional value while keeping the consumption of the pressure medium low.

The ABS and its components, as described so far, are of the same design and have the same effect and interaction as conventional models, such as are known from the previously mentioned EP 0 453 811 A2.

In case the ABS goes into action during braking, i.e., braking is ABS-regulated, the frictional value ($\mu$) calculated by the evaluation circuit (10) according to equations (VI) or (VII) is also the available one.

The regulating algorithms applied by the ABS control device (18) can be coordinated with the available frictional value ($\mu$) in order to optimize the ABS regulation through appropriate adaptation of regulating parameters. The previously-mentioned connection between inputs of the evaluation circuit (10) and the outputs of the ABS control device (18) serve that purpose. For the same purpose, an output, such as output (9) of the evaluation circuit (10), must be connected in a manner (not shown) to at least one input of the ABS control device (18), and the latter must be designed for corresponding signal processing for the adaptation of its regulating algorithms. The evaluation circuit (10) is informed via the above-mentioned connection that the ABS control device (18) emits control signals, i.e., that an ABS regulation is taking place, whereupon it transmits the available frictional value ($\mu$) as its calculation result via its corresponding output to the ABS control device (18).

Based on the available frictional value ($\mu$), adaptable regulation parameters of the ABS control device (18) could be, e.g., the reference speed, pressure gradients, and wheel acceleration thresholds.

The addition of the ABS to the basic equipment of the braking system can have very advantageous effects upon the device for the determination of frictional value. The wheel sensors (17, 19) can be used to detect the momentary vehicle deceleration (b), for example. For this purpose, the ABS angle-of-turn signals must be differentiated twice with respect to time in the evaluation circuit (10) and/or within the ABS control device (18). On the other hand, the momentary vehicle deceleration can also be calculated precisely or approximately in the evaluation circuit (10) and/or in the ABS control device (18) from the evaluation with time of the reference speed. The ABS thus makes it possible to carry out all of the operations described above and below making use of the momentary vehicle deceleration without any additional equipment and therefore at practically no additional cost.

Let it now be assumed that only one of the wheels (16, 20), e.g., the wheel (20) of the front axle (F), is braked. This would be the case of a vehicle with only one braked wheel. In that case, equations (IV) and (VIII) apply directly, as well as equations (VI) and (IX) after eliminating the element AR·pR assigned to the rear axle (R). If the wheel (20) bears the entire vehicle weight (W) in this case, the front axle load (WF) must be replaced in equation (IV) by the vehicle weight (W). In this case, other wheels of the vehicle would be non-bearing balancing or support wheels.

Let it now be assumed that the wheels (16, 20) and their assigned wheel brakes (15, 21) and brake cylinders (14, 1) are located on their corresponding axles (F or R) on one vehicle side, e.g., the right side. Further assume that the axles (F, R) are also equipped with wheels, wheel brakes and brake cylinders on the other vehicle side, i.e., the left side. With the designations "l", for left and "r" for the right vehicle side, as well as under the assumption that the wheels, brake cylinders, wheel brakes and transmission elements are identical on the left and on the right sides, as is usual, then equation (VI) becomes in that case:

$$\mu = \frac{AF(pF1 + pFr) + AR(pR1 + pRr)}{W} \quad . \tag{X}$$

The frictional value $\mu$ calculated according to equation (VII) as well as according to equation (X) is always the median value between the frictional values utilized between the wheels on the left vehicle side and the wheels on the right vehicle side and the roadway, i.e., $$\mu = \frac{\mu 1 + \mu r}{2} \quad . \tag{XI}$$

If, in that case, the frictional value for the wheels on one vehicle side is to be determined, this is possible according to two methods. The first method is based on the distribution of the frictional value ($\mu$) calculated according to equations (VII) or (X) according to the ratio of the sum of the pressures active on this vehicle side and the sum of the pressures active on the other vehicle side and uses equation (XI) after appropriate transformation. The appertaining process algorithms to be programmed into the evaluation circuit (10) are as follows:

$$\mu 1 = \frac{2\mu}{1 + \frac{pF1 + pRr}{pFr + pRr}} \tag{XII}$$

-continued $$\mu r = \frac{2\mu}{1 + \frac{pF1 + pR1}{pFr + pRr}} \quad \text{(XIII)}$$

Alternatively, the distribution of the frictional value ($\mu$) calculated according to equations (VII) or (X) over the vehicle sides can be distributed according to the ratio between the sums of the braking forces occurring on the vehicle sides. For this purpose, it is necessary to replace each pressure p with the associated braking force B=A·p in equations (XII) and (XIII).

The second method to find the frictional value associated with the wheels of one vehicle side is also based on the assumption that all wheels, brake cylinders, wheel brakes and transmission parts are identical on the left and on the right sides, and on the assumption that the wheels of an axle bear the same share of vehicle weight on either side of the longitudinal axis of the vehicle, e.g., (WF/2) on the front axle.

This method then sets the formula for the frictional value at one vehicle side in relation to the formula for the frictional value at the corresponding axle and upon using equation (VII) leads to the following appertaining process algorithms to be programmed into the evaluation circuit (10):

$$\mu 1 = \frac{2pF1}{pF1 + pFr} \cdot \frac{b}{g} \quad \text{(XIV)}$$

$$\mu r = \frac{2pFr}{pF1 + pFr} \cdot \frac{b}{g} \quad \text{(XV)}$$

Equations (IV) and (XV) can be formulated accordingly also with the pressures of the wheel brakes of the rear axle (R). In the case where the wheels, the brake cylinders, wheel brakes and transmission parts at one axle are not identical on both sides of the longitudinal axis of the vehicle, the appertaining pressures must be replaced in equations (XIV) and (XV) by the appertaining braking force B=A·p. It can easily be seen that the device for the determination of the frictional value requires pressure sensors to determine the frictional value coming to the wheels on either side of the longitudinal vehicle axis. Whereas this requirement applies to all brake cylinders in case of equations (XII) and (XIII) being used, it applies only for the brake cylinders of the axle whose pressures are being used at that moment to ascertain the frictional value coming to the wheels of the vehicle side in case equations (XIV) and (XV) are used.

It can also be easily seen that the fundamental difference between equations (XII) and (XIII) on the one hand, and equations (XIV) and (XV) on the other hand, consists in the fact that equations (XII) and (XIII) are based on the detection of the vehicle weight (W), and equations (XIV) and (XV) are based on the detection of the vehicle deceleration (b). This fundamental difference is eliminated however if the vehicle weight (W) is calculated by using equation (IX) by means of the vehicle deceleration (b) and is used in equation (X) and thereby indirectly in equation (XII) and equation (XIII).

The determination of the frictional value of the wheels on one vehicle's side is especially significant in the described addition of an ABS to the braking system. When differences exist between the available frictional values on the two vehicle sides, the so-called $\mu$ split, it is possible that the ABS becomes active only on one vehicle side. The knowledge of the available frictional value ($\mu$) on that vehicle side, acquired through equations (XII) and (XIII) or equations (XIV) and (XV), also makes it possible in this case to optimize the ABS regulation as mentioned above.

The person schooled in the art recognizes that the embodiments described above are only examples of an application of the invention, and that the invention can be implemented in all braking systems in which its characteristics, as indicated in the claims, can be realized. The invention is in particular also suitable for the previously mentioned electrically controlled braking systems (EBS) as described in the previously mentioned EP 0 548 488 A1 or U.S. Pat. No. 5,338,106. As in the described case, it is possible in that case to replace the ALB of the above-described embodiment by an electronic stability-optimizing, or nearly stability optimizing, actuating energy distribution.

While the present invention has been described by reference to specific embodiments, this was for purposes of illustration only. Numerous alternative embodiments will be apparent to those skilled in the art and are considered to be within the scope of the present invention.

We claim:

1. Method for at least approximately determining the utilized frictional value in at least one braking action between at least one wheel of a vehicle equipped with a wheel brake actuated by actuating energy, and a roadway, said method comprising the steps of:

a) determining the vehicle weight at least approximately, b) braking said vehicle, c) during said braking step, detecting a momentary actuating energy, d) calculating said utilized frictional value from said momentary actuating energy detected in step c), said vehicle weight determined in step a), and a wheel braking factor of said vehicle wheel and said wheel brake, and e) utilizing said calculated frictional value in said vehicle.

2. Method as in claim 1, wherein said step of determining said vehicle weight occurs in at least one braking action preceding said braking action associated with said determination of said frictional value and comprises the steps of:

f) determining a momentary actuating energy during said preceding braking action, g) determining, at least approximately, a momentary vehicle deceleration associated with said actuating energy determined in step f), and h) calculating said vehicle weight from the values determined in steps f) and g) and from said wheel braking factor.

3. Method as in claim 2 wherein said momentary vehicle deceleration is measured by a sensor.

4. Method as in claim 2 wherein said vehicle is equipped with an antilock braking system, and wherein said momentary vehicle deceleration is calculated from an evolution with time of a reference speed of said anti-lock braking system used in said vehicle.

5. Method as in claim 1 wherein said vehicle is equipped with at least one second wheel, said second wheel provided with a second wheel brake actuated by actuating energy, wherein said first and second wheels are located on an axle on opposite sides of a longitudinal axis of said vehicle and bear equal shares of the vehicle's weight, said method further comprising the step of:

calculating said frictional value for one or each of said first and second wheels from momentary actuating energies and wheel braking factors associated with each of said first and second wheels, and from said momentary vehicle deceleration and the Earth's gravitational acceleration.

6. Method as in claim 1 wherein said vehicle is equipped with at least one second wheel provided with a second wheel brake actuated by actuating energy, wherein said first and second wheels are located on an axle on opposite sides of a longitudinal axis of said vehicle and bear equal shares of the vehicle's weight, and wherein wheel braking factors associated with said first and second wheels are equal, said method further comprising the step of:

calculating said frictional value for one or each of said first and second wheels from momentary actuating energies associated with each of said first and second wheels, and from said momentary vehicle deceleration and the Earth's gravitational acceleration.

* * * * *